(No Model.) 4 Sheets—Sheet 2.
J. F. McLAUGHLIN.
ELECTRIC SWITCH
No. 433,360. Patented July 29, 1890.
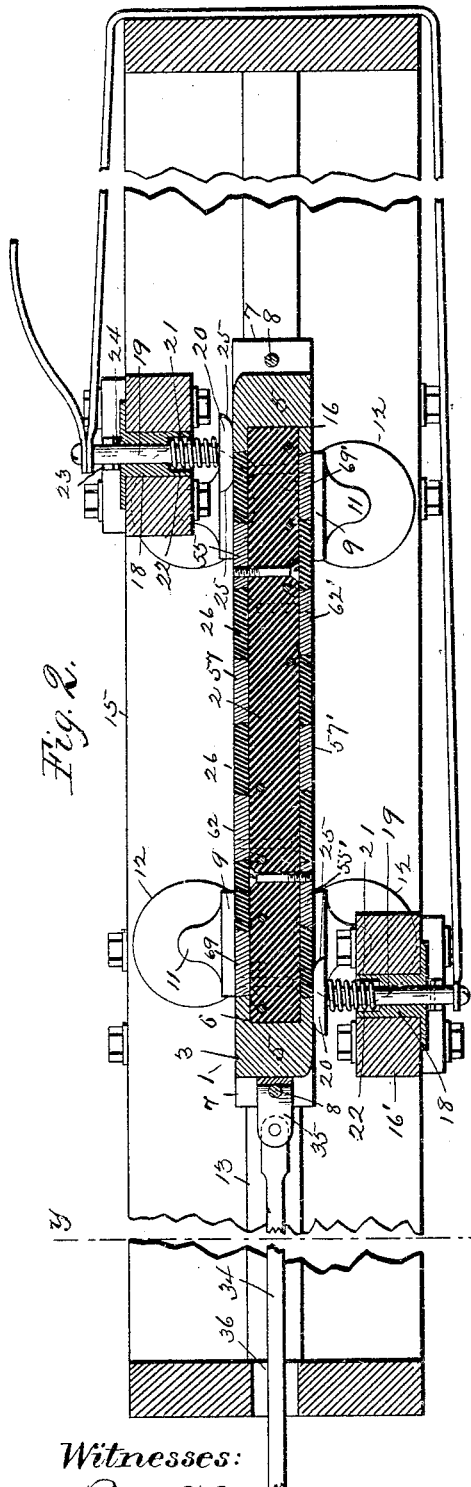
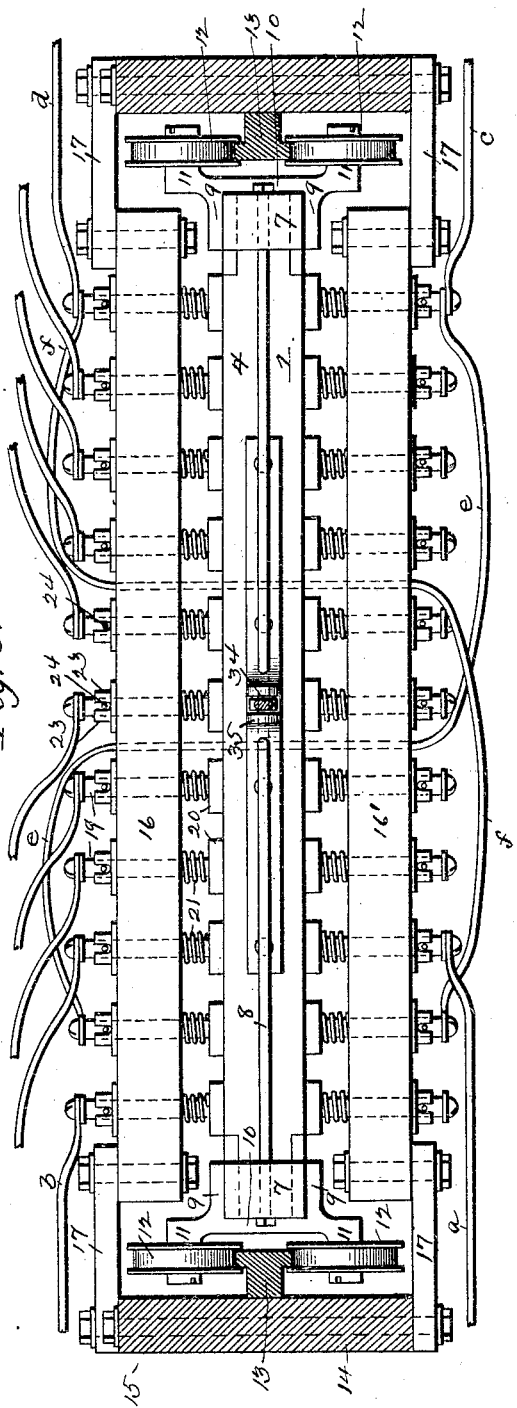
Witnesses:
Percy C. Bowen
F. T. Chapman
Inventor:
James F. McLaughlin,
By Joseph Lyon
Attorney.

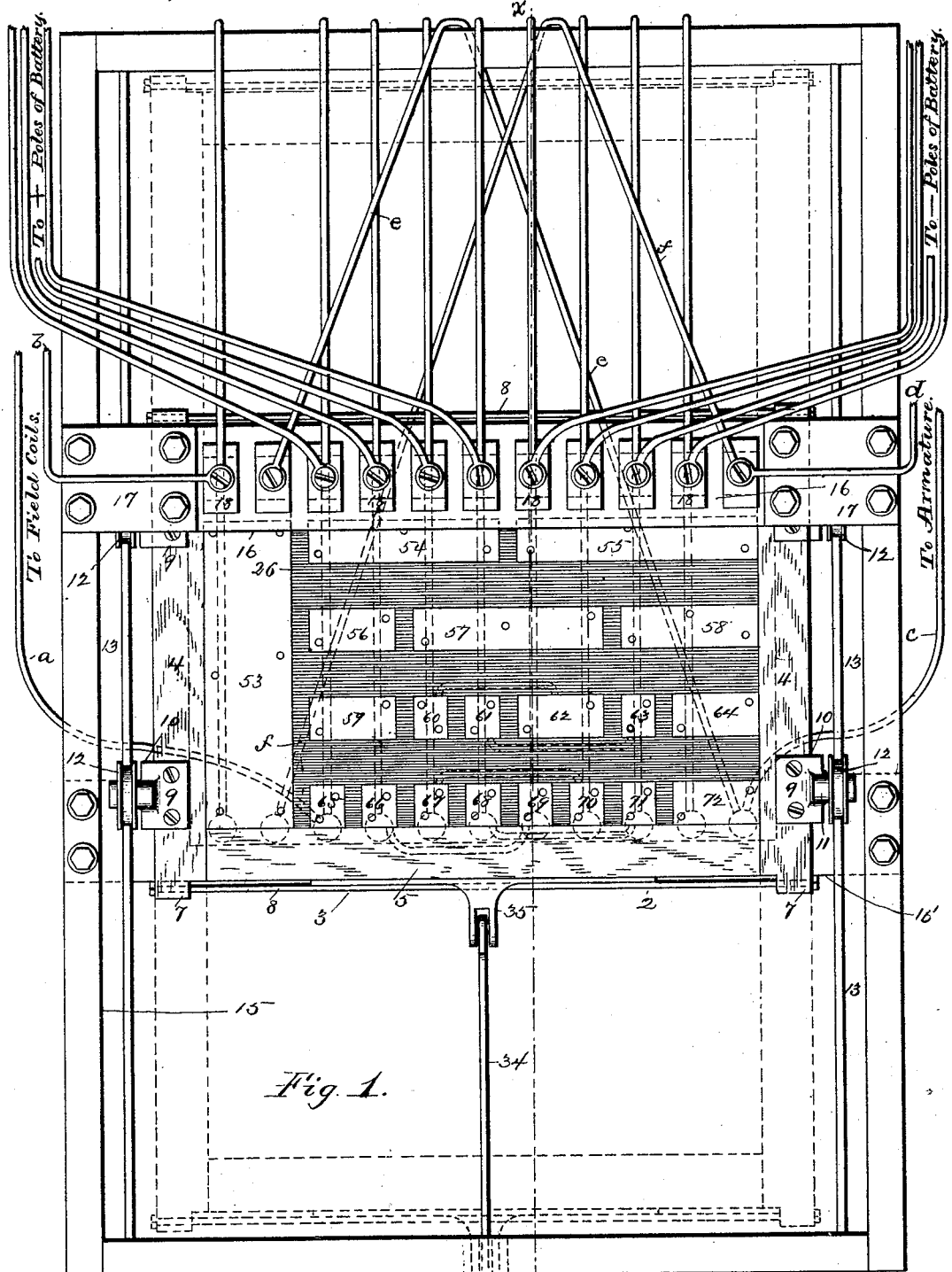

(No Model.) 4 Sheets—Sheet 3.
J. F. McLAUGHLIN.
ELECTRIC SWITCH.
No. 433,360. Patented July 29, 1890.
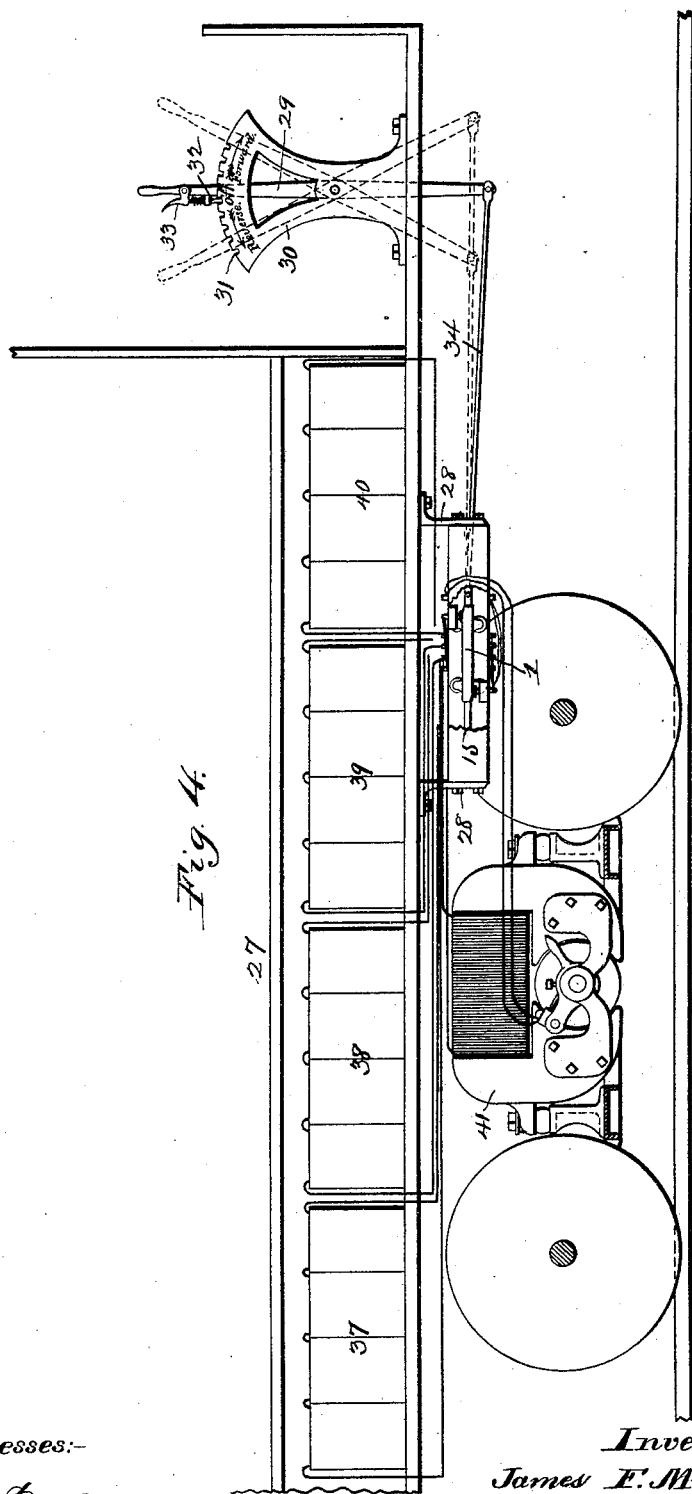
Witnesses:—
F. J. Chapman.
Fannie Wise.
Inventor:—
James F. McLaughlin,
By Joseph Lyon,
Attorney.

(No Model.) 4 Sheets—Sheet 4.
J. F. McLAUGHLIN.
ELECTRIC SWITCH.
No. 433,360. Patented July 29, 1890.
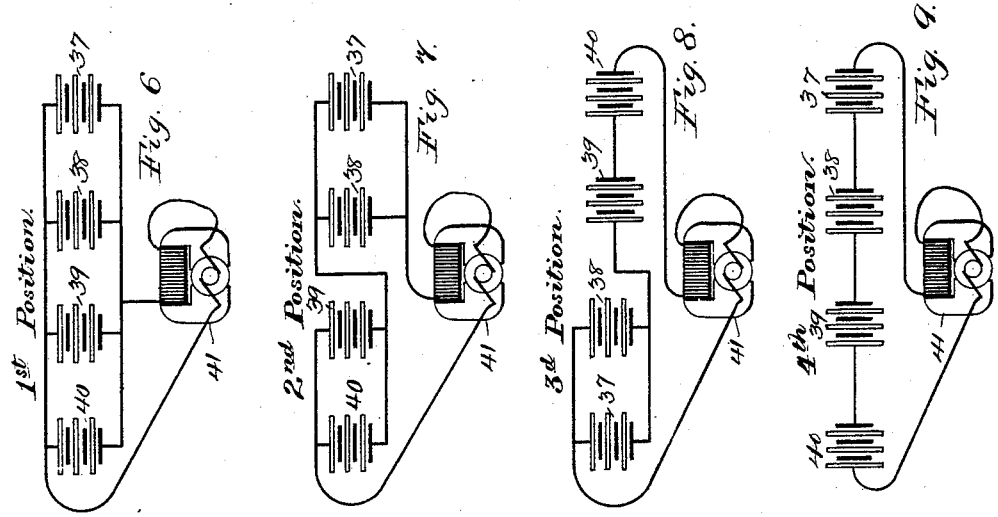
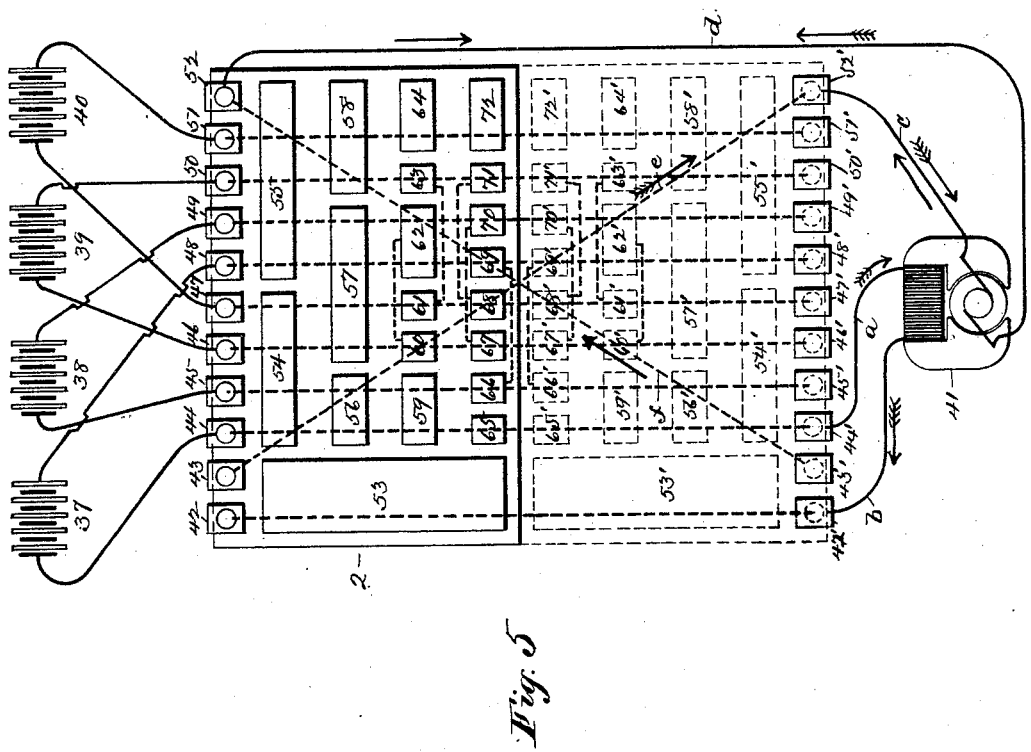
Witnesses:
Percy C. Bowen
F. T. Chapman
Inventor:
James F. McLaughlin,
By Joseph Lyon,
Attorney.

UNITED STATES PATENT OFFICE.

JAMES F. McLAUGHLIN, OF PHILADELPHIA, PENNSYLVANIA.

ELECTRIC SWITCH.

SPECIFICATION forming part of Letters Patent No. 433,360, dated July 29, 1890.

Application filed April 16, 1890. Serial No. 348,174. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Electric Switches, of which the following is a specification.

This invention has reference to switches for electric currents; and its object is to produce a switch which will couple electric batteries in such manner that they will deliver currents adapted to the character of the work to be performed, and thereby prevent waste of power.

The improved switch is designed more particularly for use with a motor-car carrying secondary electric batteries for supplying current and one or more electric motors, driven by such current, for propelling the car, and the said switch is so constructed that it may be operated by the simple manipulation of a lever to couple the batteries in the desired manner. For example, where little power is required, as when the car is running on a level or with little or no load, the switch may be so adjusted that a current adapted to such work will be sent through the motor, and when the work requires it the current may be increased until ultimately the full power of the battery will be utilized should the same be necessary. The switch is also so constructed that the motor may be reversed and that the power developed thereby is controlled, as stated.

In the accompanying drawings, forming part of this specification, I have illustrated a practical embodiment of the invention; but I am by no means confined to the exact construction shown in or described with reference to the said drawings, since the same may be varied without departing from the principle thereof.

In the drawings, Figure 1 is a plan view of the improved switch. Fig. 2 is a longitudinal section of the same on a larger scale, the section being taken on the line *x x* of Fig. 1. Fig. 3 is a cross-section on the line *y y*, Fig. 2, showing the switch in end elevation. Fig. 4 is a longitudinal section of a part of an electric-motor car, showing the switch in position thereon and the means for operating it. Fig. 5 is a diagram illustrating the circuit-connections between the switch, an electric battery, and a translating device; and Figs. 6 to 9, inclusive, are diagrams illustrating the manner in which the battery-cells are coupled when the switch is in its different positions.

Referring now more particularly to Figs. 6, 7, 8, and 9, I will say that the electric motor which I preferably use for propelling vehicles is of the kind known as "series wound," which, with a certain available amount of electrical energy, will develop the greatest power when the current supplied has considerable tension and comparatively small quantity, and will develop the least amount of power when the tension of the current is reduced as far as practicable, while the quantity is proportionately increased. It follows from this that if the source of current consists in a number of electric batteries the motor will develop the least power when the batteries are coupled for quantity, and this condition of affairs is diagrammatically illustrated in Fig. 6. The motor will develop somewhat greater power when the batteries are coupled in multiple series, as shown in Fig. 7, and will develop still greater power when the batteries are connected as shown in Fig. 8, where one portion of it, coupled for quantity, is connected in series with the remainder, which itself is connected in series, and the motor will develop its greatest power when all the batteries are connected in simple series, as is diagrammatically represented in Fig. 9.

With my improved switch I effect the couplings of the batteries, as shown in Figs. 6, 7, 8, and 9, by a step-by-step movement of one of its parts, so that these figures of the drawings represent the condition of the battery in four different positions of the switch. At the same time my switch enables me to use the battery in the same order of connection in such manner that the current to the motor will be reversed in the armature and not in the field, whereby I am enabled to reverse the action of the motor, and thus run a car in either direction with all the variations of power of which the battery is capable.

Referring now more especially to Figs. 1 to 4, inclusive, there is shown a carriage or truck 1, forming the movable member of the switch, and consisting, essentially, of a rectangular slab or plate 2, of insulating, and preferably refractory, material—such as slate—and a surrounding frame 3, of wood or other suitable material, the end pieces 4 and the side pieces 5 of which are mortised or otherwise secured together at the ends, and are grooved on the inner faces, as shown at 6, to receive the edges of the slate slab 2, which, it will be observed, is thinner than the frame 3. The end pieces 4 have short extensions 7 beyond the side pieces 5, and through eyes formed in these extensions 7 pass connecting-rods 8, which serve to secure the end pieces 4 together and brace and strengthen the frame 3.

Embracing and secured to each end piece 4 by screws or otherwise are the wings 9 of brackets 10, there being a bracket near each end of each of the said end pieces 4. On the upper and lower corners of each bracket 10 is formed an angle-arm or extension 11, terminating in a horizontal spindle, on which is mounted a grooved roller or wheel 12, the roller carried by one spindle being directly over that carried by the other spindle. The rollers on each side of the carriage 1 are so placed that they embrace T-shaped tracks 13, arranged longitudinally along the middle of side pieces 14 of a rectangular open frame 15, forming the main frame or support of the switch.

Extending laterally across the frame 15, above the carriage 1, there is a bar 16 of suitable insulating material, and of such length that there is ample space between its ends and the side pieces 14 of the said frame 15 for the passage of the wheels 12 of the carriage 1, which wheels, it will be observed, project above and below the upper surface of the said carriage. The bar 16 is supported from the side pieces 14 of the frame 15 by other and thinner bars 17, preferably of metal, bolted to the top of the bar 16 near its ends and to the top of the side pieces 14 of the said frame 15. The bar 16 is secured to the frame 15 at a distance from one end of the latter equal to about one-third of the length thereof and to the under side of the frame 15, and at a like distance from the other end thereof is secured another and in all respects similar bar 16'.

Seated in a series of equidistant perforations arranged centrally along the length of these bars 16 16' are flanged metallic thimbles 18, through which extend the stems 19 of contact-blocks, having heads 20 arranged to engage contact-plates on the carriage 1, as will presently appear. Each contact-block is forced toward the carriage by a helical spring 21, surrounding the stem 19 and confined between the head 20 and the thimble 18, the latter having a recess or seat 22 formed in it for the reception of one end of the said spring. The flanged end of each thimble 18 has formed on it two curved ears 23, embracing the stem 19, and having their edges at a suitable distance apart to form guides for the ends of a pin 24, extending through the stem 19, which pin acts as a stop for limiting the movement of the contact-block toward the carriage 1, and also prevents it from turning in its bearing, the said contact-block being preferably rectangular in shape and having its bearing-face rounded off at the front and rear, as shown at 25.

Secured to the stems 19 are the terminals of conductors, some of which are connected to the battery, while others are connected to the motor, as will hereinafter more fully appear.

On both the upper and lower surfaces of the slate slab 2 are secured several series of contact-plates, each plate being of such thickness that its exposed or contact-face is flush with the frame 3. The interstices between the individual contact-plates and between the several series are filled with suitable insulating material 26, which may, if desired, be applied in the form of a paste, and then allowed to harden, the said insulating material forming a layer of such thickness that its surface is flush with the contact-surfaces of the contact-plates and with the surface of frame 3. As shown in Fig. 2, the contact-plates, which are there indicated by light shading, are dovetailed or beveled at the edges, and are firmly secured to the slate-slab 2 by screws extending through the latter, so that the said plates firmly secure the insulating material to the slab 2, the beveled edges forming undercut seats for the said material.

As shown in Fig. 4, the switch is supported from the under side of a car 27 by means of hangers or brackets 28, bolted or otherwise secured to the ends of the main frame 15, and on the car-platform, or at any other convenient point, there is an operating-lever 29, mounted on a rack-frame 30, on the upper edge of which latter is a series of notches 31 for a spring-actuated bolt 32, controlled by the usual thumb-lever 33, pivoted to the operating-lever 29. It will be observed that, as shown, there are nine notches in the top of the rack-frame, there being a central notch designated "off" and four equidistant notches on each side thereof designated "forward" and "reverse," respectively, the purpose of which will hereinafter appear.

The carriage 1, forming the movable member of the switch, is connected to the lever 29 by a pitman or connecting-rod 34, which is pivoted to a bracket 35, secured to one of the side pieces 5 of the said carriage, and passes through a perforation 36 (see Fig. 2) in one of the end pieces of the main frame 15.

Conveniently located on the car there are several groups or series of secondary cells or elements. I prefer and in the drawings have shown four such groups, and the same are designated by the reference-numerals 37, 38, 39, and 40, respectively. The several cells of a group are shown as coupled up in series; but they might be differently coupled, and the terminals of each of the groups or batteries are connected to the switch, and the latter is connected to an electric motor 41, mounted on the car-truck.

The operation of the switch and the circuit-connections between the batteries and the motor are more clearly shown in Figs. 5 to 9, inclusive, and consequently reference is now made to these figures. The several contact-blocks supported by the bar 16 are, for convenience of reference, designated by the numerals 42 to 52, inclusive, and those supported by the bar 16′ are designated by the numerals 42′ to 52′, inclusive. On the upper face and near one side of the insulating-body 2 of the carriage there is a contact-plate 53 of such width and length that when the switch-lever 29 is moved from the "off" position to the successive notches 31 of the "forward" position the said plate 53 will ride under and be engaged by the contact-blocks 42 and 43, and remain in engagement with them throughout the forward movement of the carriage. The remainder of the contact-plates on the same or upper face of the insulating-body 2 are numbered from 54 to 72, inclusive, and are arranged in four series in such manner that each contact-plate of each series will ride under and make contact with one or more of the contact-blocks 44 to 52, inclusive, as the switch-carriage is moved in the forward position. The contact-plates on the under side of the insulating-body 2 are numbered 53′ to 72′, inclusive, and are similarly disposed, being arranged to make contact with the contact-blocks 42′ to 52′, inclusive, in like manner. As will be observed from Fig. 1, the bar 16′, carrying the lower series of contact-blocks, is below one end of the carriage 1 when the latter is in a central position in the main frame 15, while the bar 16, carrying the other series of contact-blocks, is then above the other end of the carriage 1. For this reason the contact-plates 53′ to 72′, inclusive, are arranged in inverse order to the plates 53 to 72, inclusive, since, as will be readily understood, the carriage must be moved in opposite directions in order to carry the contact-plates into engagement with the respective series of contact-blocks.

For clearness of illustration and compactness of diagram the lower series of contact-plates, together with the respective contact-blocks, are shown in Fig. 5 as though projected from under the insulating-body 2, the said plates being shown in dotted lines and the contact-blocks in full lines. The positive poles of the four battery groups are connected to the contact-blocks 44 to 47, inclusive, while the negative poles are connected to the contact-blocks 48 to 51, inclusive, and all of these contact-blocks are connected to the like blocks of the other series by suitable conductors. (Indicated in Fig. 5 by heavy dotted lines.) The contact-block 42 is connected to the contact-block 42′, and either of them is directly connected to one terminal of the field-magnet of the motor 41, the other terminal of which is connected to the contact-block 44′, which is connected to the contact-block 44. The contact-block 43 is connected to the contact-block 52′, which in turn is connected to one of the brushes of the commutator of the motor, the other brush being connected directly to the contact-block 52, and this latter-named contact-block is connected to the contact-block 43′, as shown. The contact-plate 60 on the upper surface of the insulating-body 2 is connected to the plate 62, the plate 61 is connected to the plate 63, the plate 66 is connected to the plate 69, the plate 67 is connected to the plate 70, and the plate 68 is connected to the plate 71. The contact-plates on the lower face of the insulating-body 2 are provided with a similar series of connections.

The operation of the switch will now be readily understood. When the switch-lever is moved from the "off" position toward the "forward" position until the sliding bolt 32 engages the first notch 31, the contact-plate 53 will, as before stated, be carried to a position to engage the contact-blocks 42 43 and the contact-plate 54 will engage the four contact-blocks 44 to 47, inclusive, to which are connected the positive poles of the several battery groups, and the contact-plate 55 will engage the contact-plates 48 to 52, inclusive, to which are connected the negative poles of the battery groups, and the plate 55 making contact with block 52 the four groups of batteries are coupled for quantity, as shown in diagram in Fig. 6. The circuit will then be established from the positive poles of the battery groups to the block 44, from the latter to the block 44′ and field-coil of the motor, thence returning through the blocks 42′ and 42 to the block 43 by way of the plate 53, and from thence to the block 52′ through the armature of the motor to the block 52, and by the plate 55 to the negative poles of the battery groups. The course of the current through the motor is indicated by feathered arrows. When the lever is moved to engage the second notch 31, the plate 56 will couple the blocks 44 and 45, the plate 57 will couple the blocks 46 to 49, inclusive, and the plate 58 will couple the blocks 50, 51, and 52, in which case the circuits will be established from the positive poles of the groups 37 and 38, through the blocks 44 and 45 and plate 56, and through the block 44′, to the field-magnet of the motor, and thence in the manner before described through the motor-armature to the block 52, thence by the plate 58 to the negative poles of the battery groups 39 and 40, the positive poles of which are coupled by the plate 57 and blocks 46 47 to the negative poles of the battery groups 37 and 38 by the blocks 48 and 49. In this the second position of the switch the battery groups are coupled as indicated in Fig 7—that is, the groups 37 and 38 are coupled together in multiple, as are also the groups 39 and 40, and the two sets of groups so coupled are connected in series.

In the third position of the switch—that is, when the switch-lever has been moved so that the sliding bolt 32 engages the third notch 31 in the "forward" direction—the plate 59 couples the blocks 44 and 45, and the plate 60 (which is connected to the plate 62) couples the block 46 with the said plate 62, which in turn couples the blocks 48 and 49. The plate 61, being connected with the plate 63, couples the block 47 with the block 50, which is then in contact with the said plate 63, and the plate 64 couples the blocks 51 and 52. In this instance the positive poles of the groups 37 and 38, being connected to the blocks 44 and 45, are coupled by the plate 59, the circuit being then established through the block 44 to the block 44' and field-magnet of the motor, thence in the manner before described to and through the motor-armature to the block 52, thence by plate 64 to the block 51, and to the negative pole of the battery group 40. The positive pole of this group being connected to the block 47 is coupled through the plates 61 and 63 and the block 50 to the negative pole of the group 39, and the positive pole of the latter is coupled through the block 46, plates 60 and 62, and the blocks 48 and 49 to the negative poles of the two groups 37 and 38, the said negative poles of these two last-named groups being thus coupled by the said plate 62. It will thus be seen that in the third position of the switch the battery groups are coupled as illustrated in Fig. 8—that is, the groups 37 and 38 are coupled in multiple and are then connected in series to the groups 39 and 40, which latter are also coupled in series.

In the fourth position of the switch—that is, when the switch-lever has been moved so that the sliding bolt 32 engages the fourth or last notch 31 in the forward direction—the connected plates 66 and 69 couple the positive pole of the battery group 38 to the negative pole of the group 37. The connected plates 67 and 70 couple the positive pole of the battery group 39 to the negative pole of the group 38. The connected plates 68 and 71 couple the positive pole of the battery group 40 to the negative pole of the group 39, and the plate 72, being of sufficient length to bridge the contact-blocks 51 and 52, connects the negative pole of the battery group 40 with one of the commutator-brushes of the motor. The positive pole of the battery group 37 is connected to one terminal of the field-coil, and the other terminal of the latter is connected to the commutator-brush in the manner before explained. In the fourth position of the switch, therefore, the battery groups are all coupled in series, as indicated in the diagram, Fig. 9.

The operation of the switch when the lever 29 is moved from the "off" position to the "reverse" position is similar to that described with reference to the "forward" movement of the switch-carriage, except that the course of the current through the armature is reversed. The reversal of current through the armature of the motor is brought about in consequence of the permanent cross-connection of contact-blocks 43' and 52. To facilitate the tracing of the current, I have marked the conductor connecting-block 44' with the field-magnet with the letter $a$, the conductor coming from the other terminal with the field-magnet $b$, the conductor from one commutator-brush to block 52' with $c$, the connection of the other commutator-brush to block 52 with $d$, the diagonal cross-connection between blocks 43 and 52' with $e$, and the like connection between blocks 43' and 52 with $f$. It will now be seen that in any "forward" position of the switch-carriage the current entering the field-coil by conductor $a$ and leaving at $b$ will, after passing from block 42' to 42 and 43, reach the block 52' by way of the diagonal cross-conductor $e$, and will enter the armature by the conductor $c$, leaving it by conductor $d$. In any "reversed" position of the switch-carriage the current, after having passed through the field, as before, will reach the block 43', (since 42' and 43' are now connected by plate 53',) and will from 43' continue by way of diagonal cross-connection $f$ to block 52, and then enter the armature by conductor $d$, leaving it by conductor $c$. The current through the armature is thus reversed, as indicated by unfeathered arrows, the motor is thereby reversed, and the car is propelled backward. When the switch is in the first forward or reverse position, the battery groups are coupled in multiple, and consequently supply a current of comparatively low tension, and for this reason, the motor being wound for high-tension currents, as before stated, will develop a correspondingly small amount of power. In the second and third positions the battery groups are so coupled that currents of higher tension are delivered, and the motor develops correspondingly greater power, and in the fourth position, the battery groups being all coupled in series, the motor develops the maximum power. If the motor be wound for low-tension currents, the development of power from the minimum to the maximum will be effected by reversing the order of the series of contact-plates on the carriage.

It will be observed that in the use of my improved switch all cells or batteries controlled by the same are at all times in the working-circuit, so long as the motor is being actuated—that is to say, at no time is any part of the battery cut out of circuit—and the consequence of this is that the batteries are all being exhausted uniformly, each delivering current at all times.

Prior to my invention, when a motor or other translating device was operated with variable force by a number of batteries it was the practice, when less force was required, to cut one or more cells or batteries out of circuit. The effect of this was, more especially in secondary batteries, that some batteries became exhausted, while others were still fresh, and if in this condition of the plant the batteries were coupled for quantity the live cells or batteries would be short-circuited to a very great extent by the exhausted cells or batteries, whereby a great amount of current was consumed without useful effect, and the exhausted cells were polarized or charged in the reverse direction. Besides this, a failure of the whole battery to furnish the required amount of current did not necessarily indicate an exhaustion of every element of the battery, and it then required a test of each cell or battery to determine which one was exhausted and should be replaced by a fresh one. All this is avoided by my improved switch and by the method practiced by means of the same.

Having now fully described my invention, I claim and desire to secure by Letters Patent—

1. An electric switch consisting of a reciprocating carriage having series of contact-plates on opposite faces and spring-actuated contact-blocks in operative relation thereto, substantially as described.

2. An electric switch consisting of a wheeled reciprocating carriage running upon tracks and having series of contact-plates on opposite faces and a series of stationary spring-actuated contacts for each face of the carriage, substantially as described.

3. In an electric switch, the combination of two series of spring-actuated contact-blocks and a reciprocating carriage having a series of groups of contact-plates in operative relation to one series of contact-blocks for successive coupling of electric batteries in a predetermined order as the carriage moves in one direction, with another series of groups of contact-plates in relation to the second series of contact-blocks for coupling the batteries successively in the same predetermined order as the carriage moves in the other direction, substantially as described.

4. In an electric switch controlling a motor-circuit, the combination of two series of spring-actuated contact-blocks and a reciprocating carriage having a series of groups of contact-plates in operative relation to one series of contact-blocks for successive coupling of electric batteries in a predetermined order as the carriage moves in one direction, with another series of groups of contact-plates, also on the carriage, in relation to the second series of contact-blocks for coupling the batteries successively in the same order, and cross-connections between the contact-blocks of the two series, whereby the current through the armature of the motor is reversed by the reversed movement of the carriage, substantially as described.

In testimony whereof I have signed my name to this specification in the presence of two subscribing witnesses.

JAMES F. McLAUGHLIN.

Witnesses:
 H. F. REARDON,
 HERBERT P. KER.